(12) United States Patent
Shennib

(10) Patent No.: US 11,115,519 B2
(45) Date of Patent: Sep. 7, 2021

(54) SUBSCRIPTION-BASED WIRELESS SERVICE FOR A HEARING DEVICE

(71) Applicant: K/S HIMPP, Lynge (DK)

(72) Inventor: Adnan Shennib, Oakland, CA (US)

(73) Assignee: K/S HIMPP, Lynge (DK)

( * ) Notice: Subject to any disclaimer, the term of this patent is extended or adjusted under 35 U.S.C. 154(b) by 0 days.

(21) Appl. No.: 16/808,071

(22) Filed: Mar. 3, 2020

(65) Prior Publication Data

US 2020/0304624 A1 Sep. 24, 2020

Related U.S. Application Data

(63) Continuation of application No. 14/937,712, filed on Nov. 10, 2015, now abandoned.

(60) Provisional application No. 62/078,361, filed on Nov. 11, 2014.

(51) Int. Cl.
*H04M 1/72415* (2021.01)
*H04B 1/3827* (2015.01)
*H04W 4/80* (2018.01)
*H04M 1/60* (2006.01)
*H04R 25/00* (2006.01)

(52) U.S. Cl.
CPC ........ *H04M 1/72415* (2021.01); *H04B 1/385* (2013.01); *H04M 1/6066* (2013.01); *H04R 25/554* (2013.01); *H04W 4/80* (2018.02); *H04B 2001/3866* (2013.01); *H04R 25/70* (2013.01); *H04R 2225/023* (2013.01); *H04R 2225/55* (2013.01)

(58) Field of Classification Search
CPC ............ H04L 65/1073; H04M 1/2535; H04M 1/72591; H04R 25/554; H04R 2225/31; H04R 2225/55; H04R 25/556; H04R 2225/023; H04R 25/558; H04R 29/00; H04W 4/00; G06F 21/31; H04B 1/385; H04B 2001/3866
USPC .......... 455/410, 411, 556.1, 575.6; 381/312, 381/315, 328, 330; 379/52
See application file for complete search history.

(56) References Cited

U.S. PATENT DOCUMENTS

| 3,659,056 A | 4/1972 | Morrison et al. |
| 4,628,907 A | 12/1986 | Epley |
| 4,759,070 A | 7/1988 | Voroba |
| 4,817,607 A | 4/1989 | Tatge |

(Continued)

FOREIGN PATENT DOCUMENTS

| KR | 100955033 B1 | 4/2010 |
| KR | 1020100042370 A | 4/2010 |

(Continued)

OTHER PUBLICATIONS

U.S. Appl. No. 15/724,854, entitled "Hearing Device And Methods For Wireless Remote Control Of An Appliance" filed Oct. 4, 2017.

(Continued)

*Primary Examiner* — Olumide Ajibade Akonai
(74) *Attorney, Agent, or Firm* — Dorsey & Whitney LLP

(57) ABSTRACT

Examples of subscription-based wireless hearing device systems and methods are described. An exemplary system includes a wireless hearing device and a personal computing device to enable or disable a wireless service of the wireless hearing device in accordance of a subscription. The subscription may be verified using subscription data or validation data received from a remote server.

30 Claims, 7 Drawing Sheets

(56) References Cited

U.S. PATENT DOCUMENTS

| | | |
|---|---|---|
| 5,003,608 A | 3/1991 | Carlson |
| 5,197,332 A | 3/1993 | Shennib |
| 5,327,500 A | 7/1994 | Campbell |
| 5,425,104 A | 6/1995 | Shennib |
| 5,553,152 A | 9/1996 | Newton |
| 5,603,726 A | 2/1997 | Schulman et al. |
| 5,610,988 A | 3/1997 | Miyahara |
| 5,615,229 A | 3/1997 | Sharma et al. |
| 5,645,074 A | 7/1997 | Shennib et al. |
| 5,659,621 A | 8/1997 | Newton |
| 5,701,348 A | 12/1997 | Shennib et al. |
| 5,721,783 A | 2/1998 | Anderson |
| 5,768,397 A | 6/1998 | Fazio |
| 5,785,661 A | 7/1998 | Shennib et al. |
| 6,021,207 A | 2/2000 | Puthuff et al. |
| 6,137,889 A | 10/2000 | Shennib et al. |
| 6,212,283 B1 | 4/2001 | Fletcher et al. |
| 6,319,207 B1 | 11/2001 | Naidoo |
| 6,359,993 B2 | 3/2002 | Brimhall |
| 6,367,578 B1 | 4/2002 | Shoemaker |
| 6,379,314 B1 | 4/2002 | Horn |
| 6,382,346 B2 | 5/2002 | Brimhall et al. |
| 6,428,485 B1 | 8/2002 | Rho |
| 6,447,461 B1 | 9/2002 | Eldon |
| 6,473,513 B1 | 10/2002 | Shennib et al. |
| 6,522,988 B1 | 2/2003 | Hou |
| 6,546,108 B1 | 4/2003 | Shennib et al. |
| 6,674,862 B1 | 1/2004 | Magilen |
| 6,694,034 B2 | 2/2004 | Julstrom et al. |
| 6,724,902 B1 | 4/2004 | Shennib et al. |
| 6,816,601 B2 | 11/2004 | Lin et al. |
| 6,840,908 B2 | 1/2005 | Edwards et al. |
| 6,937,735 B2 | 8/2005 | DeRoo et al. |
| 6,940,988 B1 | 9/2005 | Shennib et al. |
| 6,940,989 B1 | 9/2005 | Shennib et al. |
| 6,978,155 B2 | 12/2005 | Berg |
| 7,010,137 B1 | 3/2006 | Leedom et al. |
| 7,016,511 B1 | 3/2006 | Shennib |
| 7,037,274 B2 | 5/2006 | Thoraton et al. |
| 7,113,611 B2 | 9/2006 | Leedom et al. |
| 7,164,775 B2 | 1/2007 | Meyer et al. |
| 7,181,032 B2 | 2/2007 | Jakob et al. |
| 7,215,789 B2 | 5/2007 | Shennib et al. |
| 7,221,769 B1 | 5/2007 | Jorgensen |
| 7,227,968 B2 | 6/2007 | van Halteren et al. |
| 7,260,232 B2 | 8/2007 | Shennib |
| 7,266,208 B2 | 9/2007 | Charvin et al. |
| 7,298,857 B2 | 11/2007 | Shennib et al. |
| 7,310,426 B2 | 12/2007 | Shennib et al. |
| 7,321,663 B2 | 1/2008 | Olsen |
| 7,330,101 B2 | 2/2008 | Sekura |
| 7,403,629 B1 | 7/2008 | Aceti et al. |
| 7,421,087 B2 | 9/2008 | Perkins et al. |
| 7,424,123 B2 | 9/2008 | Shennib et al. |
| 7,424,124 B2 | 9/2008 | Shennib et al. |
| 7,512,383 B2 | 3/2009 | Essabar et al. |
| 7,580,537 B2 | 8/2009 | Urso et al. |
| 7,664,282 B2 | 2/2010 | Urso et al. |
| 7,720,242 B2 | 5/2010 | Anderson et al. |
| 7,751,578 B2 | 7/2010 | Arz et al. |
| 7,854,704 B2 | 12/2010 | Givens et al. |
| 7,945,065 B2 | 5/2011 | Menzl et al. |
| 8,036,405 B2 | 10/2011 | Ludvigsen et al. |
| 8,073,170 B2 | 12/2011 | Kondo et al. |
| 8,077,890 B2 | 12/2011 | Schumaier |
| 8,116,494 B2 | 2/2012 | Rass et al. |
| 8,155,361 B2 | 4/2012 | Schindler |
| 8,175,306 B2 | 5/2012 | Meskens et al. |
| 8,184,842 B2 | 5/2012 | Howard et al. |
| 8,243,972 B2 | 8/2012 | Latzel |
| 8,284,968 B2 | 10/2012 | Schumaier |
| 8,287,462 B2 | 10/2012 | Givens et al. |
| 8,340,335 B1 | 12/2012 | Shennib |
| 8,379,871 B2 | 2/2013 | Michael et al. |
| 8,396,237 B2 | 3/2013 | Schumaier |
| 8,447,042 B2 | 5/2013 | Gurin |
| 8,467,556 B2 | 6/2013 | Shennib et al. |
| 8,503,703 B2 | 8/2013 | Eaton |
| 8,571,247 B1 | 10/2013 | Oezer |
| 8,718,306 B2 | 5/2014 | Gommel et al. |
| 8,767,986 B1 | 7/2014 | Fabry et al. |
| 8,798,301 B2 | 8/2014 | Shennib |
| 8,855,345 B2 | 10/2014 | Shennib et al. |
| 8,867,768 B2 | 10/2014 | Contioso et al. |
| 9,002,046 B2 | 4/2015 | Jones et al. |
| 9,060,233 B2 | 6/2015 | Shennib et al. |
| 9,559,544 B2 | 1/2017 | Jakubowski |
| 9,769,577 B2 | 9/2017 | Shennib |
| 9,805,590 B2 | 10/2017 | Shennib |
| 10,097,933 B2 | 10/2018 | Shennib |
| 10,242,565 B2 | 3/2019 | Shennib |
| 10,587,964 B2 | 3/2020 | Shennib |
| 2001/0008560 A1 | 7/2001 | Stonikas et al. |
| 2002/0027996 A1 | 3/2002 | Leedom et al. |
| 2002/0054689 A1 | 5/2002 | Zhang et al. |
| 2002/0085728 A1 | 7/2002 | Shennib et al. |
| 2003/0007647 A1 | 1/2003 | Nielsen et al. |
| 2003/0137277 A1 | 7/2003 | Mori et al. |
| 2004/0138723 A1 | 7/2004 | Malick et al. |
| 2004/0165742 A1 | 8/2004 | Shennib et al. |
| 2004/0234092 A1 | 11/2004 | Wada et al. |
| 2005/0190938 A1 | 9/2005 | Shennib et al. |
| 2005/0245991 A1 | 11/2005 | Faltys et al. |
| 2005/0249370 A1 | 11/2005 | Shennib et al. |
| 2005/0259840 A1 | 11/2005 | Gable et al. |
| 2005/0283263 A1 | 12/2005 | Eaton et al. |
| 2006/0210104 A1 | 9/2006 | Shennib et al. |
| 2006/0291683 A1 | 12/2006 | Urso et al. |
| 2007/0019834 A1 | 1/2007 | Nielson |
| 2007/0076909 A1 | 4/2007 | Roeck et al. |
| 2007/0127757 A2 | 6/2007 | Darbut et al. |
| 2007/0195966 A1 | 8/2007 | Fink et al. |
| 2007/0255435 A1 | 11/2007 | Cohen et al. |
| 2007/0274553 A1 | 11/2007 | Rass et al. |
| 2008/0095387 A1 | 4/2008 | Niederdrank et al. |
| 2008/0240452 A1 | 10/2008 | Burrows et al. |
| 2008/0273726 A1 | 11/2008 | Yoo et al. |
| 2009/0052706 A1 | 2/2009 | Gottschalk et al. |
| 2009/0169039 A1 | 7/2009 | Rasmussen et al. |
| 2009/0196444 A1 | 8/2009 | Solum et al. |
| 2010/0027824 A1 | 2/2010 | Atamaniuk et al. |
| 2010/0040250 A1 | 2/2010 | Gebert |
| 2010/0086157 A1 | 4/2010 | Feeley et al. |
| 2010/0119094 A1 | 5/2010 | Sjursen et al. |
| 2010/0145411 A1 | 6/2010 | Spitzer |
| 2010/0179444 A1 | 7/2010 | Obrien et al. |
| 2010/0201513 A1 | 8/2010 | Vorenkamp et al. |
| 2010/0232612 A1 | 9/2010 | Basseas et al. |
| 2010/0239112 A1 | 9/2010 | Howard et al. |
| 2010/0254553 A1 | 10/2010 | Nikles et al. |
| 2010/0254554 A1 | 10/2010 | Fusakawa et al. |
| 2010/0272299 A1 | 10/2010 | Van Schuylenbergh et al. |
| 2010/0284556 A1 | 11/2010 | Young |
| 2011/0019847 A1 | 1/2011 | Klemenz et al. |
| 2011/0040829 A1* | 2/2011 | Lee .................. H04L 67/10 709/203 |
| 2011/0058697 A1 | 3/2011 | Shennib et al. |
| 2011/0091060 A1 | 4/2011 | von Dombrowski et al. |
| 2011/0182453 A1 | 7/2011 | Van Hal et al. |
| 2011/0188689 A1 | 8/2011 | Beck et al. |
| 2011/0200216 A1 | 8/2011 | Lee et al. |
| 2011/0206225 A1 | 8/2011 | Møller et al. |
| 2011/0221391 A1 | 9/2011 | Won et al. |
| 2011/0243357 A1 | 10/2011 | Probst et al. |
| 2011/0286616 A1 | 11/2011 | Beck et al. |
| 2011/0293123 A1 | 12/2011 | Neumeyer et al. |
| 2012/0051569 A1 | 3/2012 | Blamey et al. |
| 2012/0130271 A1 | 5/2012 | Margolis et al. |
| 2012/0183164 A1 | 7/2012 | Foo et al. |
| 2012/0183165 A1 | 7/2012 | Foo et al. |
| 2012/0189140 A1 | 7/2012 | Hughes |
| 2012/0189146 A1 | 7/2012 | Wuidart |
| 2012/0213393 A1 | 8/2012 | Foo et al. |
| 2012/0215532 A1 | 8/2012 | Foo et al. |

(56) References Cited

U.S. PATENT DOCUMENTS

| | | |
|---|---|---|
| 2012/0302859 A1 | 11/2012 | Keefe |
| 2013/0010406 A1 | 1/2013 | Stanley |
| 2013/0142367 A1 | 6/2013 | Berry et al. |
| 2013/0243209 A1 | 9/2013 | Zurbruegg et al. |
| 2013/0243229 A1 | 9/2013 | Shennib et al. |
| 2013/0294631 A1 | 11/2013 | Shennib et al. |
| 2013/0343584 A1* | 12/2013 | Bennett ............... H04R 25/554 381/315 |
| 2013/0343585 A1 | 12/2013 | Bennett et al. |
| 2014/0003639 A1 | 1/2014 | Shennib et al. |
| 2014/0029777 A1 | 1/2014 | Jang |
| 2014/0150234 A1 | 6/2014 | Shennib et al. |
| 2014/0153761 A1 | 6/2014 | Shennib et al. |
| 2014/0153762 A1 | 6/2014 | Shennib et al. |
| 2014/0247109 A1* | 9/2014 | Curry ................. G06Q 30/0601 340/5.1 |
| 2014/0254843 A1 | 9/2014 | Shennib |
| 2014/0254844 A1 | 9/2014 | Shennib |
| 2015/0003651 A1 | 1/2015 | Han et al. |
| 2015/0023512 A1 | 1/2015 | Shennib |
| 2015/0023534 A1 | 1/2015 | Shennib |
| 2015/0139474 A1 | 5/2015 | Henry et al. |
| 2015/0382198 A1 | 12/2015 | Kashef et al. |
| 2016/0049074 A1 | 2/2016 | Shennib |
| 2016/0057550 A1 | 2/2016 | Shennib |
| 2016/0100261 A1 | 4/2016 | Shennib |
| 2016/0134742 A1 | 5/2016 | Shennib |
| 2017/0063434 A1 | 3/2017 | Hviid et al. |
| 2017/0112671 A1 | 4/2017 | Goldstein |
| 2017/0180883 A1 | 6/2017 | Sommer et al. |
| 2017/0332183 A1 | 11/2017 | Shennib |
| 2018/0025627 A1 | 1/2018 | Shennib |
| 2020/0213782 A1 | 7/2020 | Shennib |
| 2020/0213783 A1 | 7/2020 | Shennib |
| 2020/0213784 A1 | 7/2020 | Shennib |

FOREIGN PATENT DOCUMENTS

| | | |
|---|---|---|
| WO | 99/07182 A2 | 2/1999 |
| WO | 2010/091480 A1 | 8/2010 |
| WO | 2011128462 A2 | 10/2011 |
| WO | 2011159349 A1 | 12/2011 |
| WO | 2015009564 A1 | 1/2015 |
| WO | 2015009569 A1 | 1/2015 |
| WO | 2016025826 A1 | 2/2016 |

OTHER PUBLICATIONS

"Lyric User Guide", http://www.phonak.com/content/dam/phonak/b2b/C_M_tools/Hearing_Instruments/Lyric/documents/02-gb/Userguide_Lyric_V8_GB_FINAL_WEB.pdf, Jul. 2010.

"Methods for Calculation of the Speech Intelligibility Index", American National Standards Institute, Jun. 6, 1997.

"Specification for Audiometers", American National Standards Institute, Nov. 2, 2010.

U.S. Appl. No. 15/669,747, entitled, "Interactive Wireless Control of Appliances by a Hearing Device", filed Aug. 4, 2017.

"User Manual—2011", AMP Personal Audio Amplifiers.

Abrams, , "A Patient-adjusted Fine-tuning Approach for Optimizing the Hearing Aid Response", The Hearing Review, Mar. 24, 2011, 1-8.

Asha, , "Type, Degree, and Configuration of Hearing Loss", American Speech-Language-Hearing Association; Audiology Information Series, May 2011, 1-2.

Convery, et al., "A Self-Fitting Hearing Aid: Need and Concept", http://tia.sagepubl.com, Dec. 4, 2011, 1-10.

Franks, , "Hearing Measurements", National Institute for Occupational Safety and Health, Jun. 2006, 183-232.

Kiessling, , "Hearing aid fitting procedures—state-of-the-art and current issues", Scandinavian Audiology vol. 30, Suppl 52, 2001, 57-59.

Nhanes, , "Audiometry Procedures Manual", National Health and Nutrition Examination Survey, Jan. 2003, 1-105.

Traynor, , "Prescriptive Procedures", www.rehab.research.va.gov/mono/ear/traynor.htm, Jan. 1999, 1-16.

World Health Organization, , "Deafness and Hearing Loss", www.who.int/mediacentre/factsheets/fs300/en/index.html, Feb. 2013, 1-5.

Wu, et al., "Selective Signal Transmission to Inlaid Microcoils by Inductive Coupling", IEEE Transducers 2003, 12th International Conference of Solid State Senseors Transducers, Boston 2003.

* cited by examiner

SUBSCRIPTION-BASED WIRELESS SERVICE FOR A HEARING DEVICE

CROSS-REFERENCE TO RELATED APPLICATIONS

This application is a continuation of U.S. application Ser. No. 14/937,712, filed Nov. 10, 2015, which claims the benefit under 35 U.S.C. 119 of the earlier filing date of U.S. Provisional Application No. 62/078,361 entitled "SUBSCRIPTION-BASED WIRELESS SERVICE FOR A HEARING DEVICE," filed Nov. 11, 2014. The aforementioned applications are hereby incorporated by reference in their entirety, for any purpose.

TECHNICAL FIELD

Examples described herein relate to hearing devices, and include particularly subscription-based wireless hearing devices.

BACKGROUND

The ear canal 14 is generally hidden from view (front and side) behind a backward projecting eminence known as the tragus 5, as shown in FIG. 1. The ear canal 14 is also hidden from view from the back by the presence of the pinna 4 (also referred to as auricle). The dimensions and contours of the ear canal 14 vary significantly among individuals.

Placement of a hearing device inside the ear canal 14 is generally desirable for various electroacoustic advantages such as reduction of the acoustic occlusion effect, improved energy efficiency, reduced distortion, reduced receiver vibrations, and improved high frequency response. Canal placement may also be desirable for cosmetic reasons since the majority of the hearing impaired may prefer to wear an inconspicuous hearing device. A canal hearing device can be inserted entirely or partially inside the ear canal. In the context of this application, any hearing device inserted inside the ear canal, whether partially or completely, may be referred to as a canal hearing device. This includes what is known in the hearing aid industry as Completely-In-the-Canal (CIC), Receiver-In-Canal, (RIC), In-The-Canal (ITC), and extended wear deep canal invisible types.

The cost of a canal hearing device can be several thousands of dollars which is prohibitive to many potential consumers. According to industry reports, roughly 1 in 5 hearing impaired people own a hearing device, leaving the majority without a hearing solution. Solutions to make canal hearing devices more affordable and/or accessible to hearing impaired people may be desirable.

SUMMARY

A wireless hearing device system for providing a subscription-based wireless service may include a hearing device and a personal computing device. The hearing device may include wireless circuitry, a memory and a speaker. The speaker may be configured for placement inside the ear canal. The memory may store identification data associated with the hearing device. The hearing device may be configured to selectively provide a wireless service. The wireless service provided by or to the hearing device may be enabled, disabled, or controlled in accordance with the validation data or the subscription data. In some examples, the hearing device may be communicatively coupled to a wireless gateway device for communication with a remote subscription database. The wireless gateway device may be configured to communicatively couple the hearing device to a remote server.

The personal computing device may be configured to communicatively couple to the hearing device and validate a subscription of the hearing device using subscription data and the identification data. The personal computing device may receive the identification data from the hearing device. The remote server may be configured to receive the identification data associated with the hearing device. The subscription data and/or the validation data may be determined using the identification data. The subscription data and/or the validation data may be stored in the remote subscription database. The personal computer may receive subscription data from a remote server.

BRIEF DESCRIPTION OF THE DRAWINGS

The above and still further objectives, features, aspects and attendant advantages of the present invention will become apparent from the following detailed description of certain preferred and alternate embodiments and method of manufacture and use thereof constituting the best mode presently contemplated of practicing the invention, when taken in conjunction with the accompanying drawings, in which.

DETAILED DESCRIPTION

Figure 1:
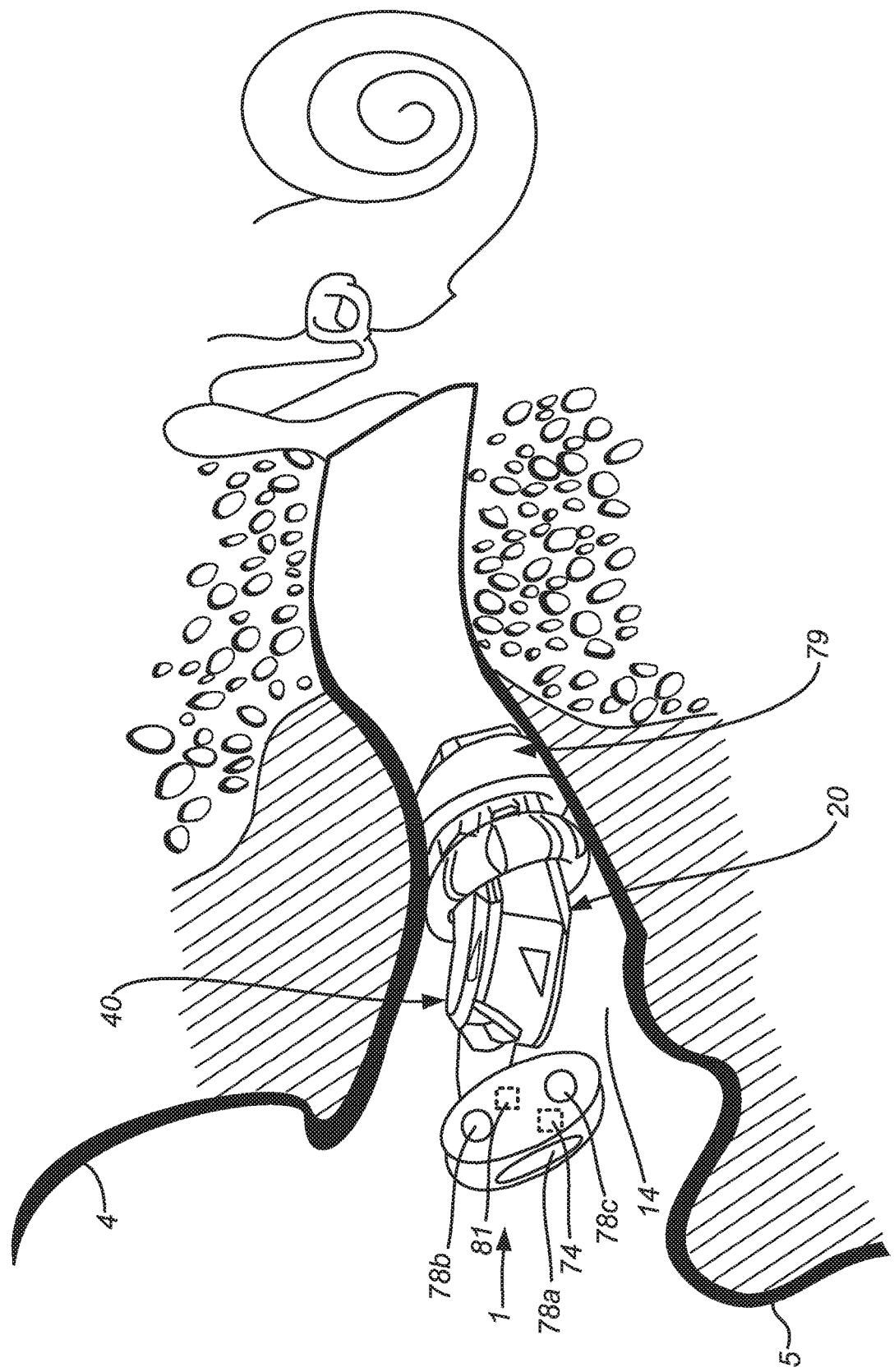
FIG. 1 is a view of the ear canal, showing an example of a wireless canal hearing device assembly inserted therein.

Certain details are set forth below to provide a sufficient understanding of embodiments of the invention. However, it will be appreciated by one skilled in the art that some embodiments may not include all details described. In some instances, well-known structures, hearing aid components, circuits, and controls, have not been shown in order to avoid unnecessarily obscuring the described embodiments of the invention.

The present disclosure describes examples of subscription-based wireless services associated with a wireless hearing device system. The wireless hearing device system according to examples of the present disclosure may include a hearing device configured to selectively provide a wireless service. In some examples, the hearing device may be configured to activate or provide a wireless service in accordance with a subscription. The hearing device may include a lateral section and a main section. The hearing device may be integrated or modular. In some embodiments, the hearing device may receive subscription data and/or validation data associated with the subscription from a computing device or from a remote server associated with the wireless hearing device system.

In some examples, the wireless hearing device system may include a hearing device 1 having a main section 20 and a lateral section 40. The main section 20 may include durable components, such as a microphone, a speaker 57, a wireless electronics 74, a wireless antenna 75, and sound processing circuitry. The hearing device 1 may be configured for positioning in the ear. The hearing device 1 may include a memory, for example non-volatile memory. The memory may store identification data 80, as described herein. The lateral section 40 may incorporate a rechargeable battery cell 42 therein. In some examples, the hearing device 1 may be an integrated assembly. In some examples the hearing device 1 may include a modular main section 20 (also referred to as main module) and a modular lateral section 40 (also referred to as lateral module). The lateral module 40 may be configured for mating with the main module 20 to form a canal hearing device 1 (interchangeably referred to herein as a canal hearing device assembly, hearing device assembly, canal hearing device, and hearing device). The speaker 57 of the hearing device 1 may be configured to transmit sounds 55 into the ear canal 14 of a user 100.

Figure 2:
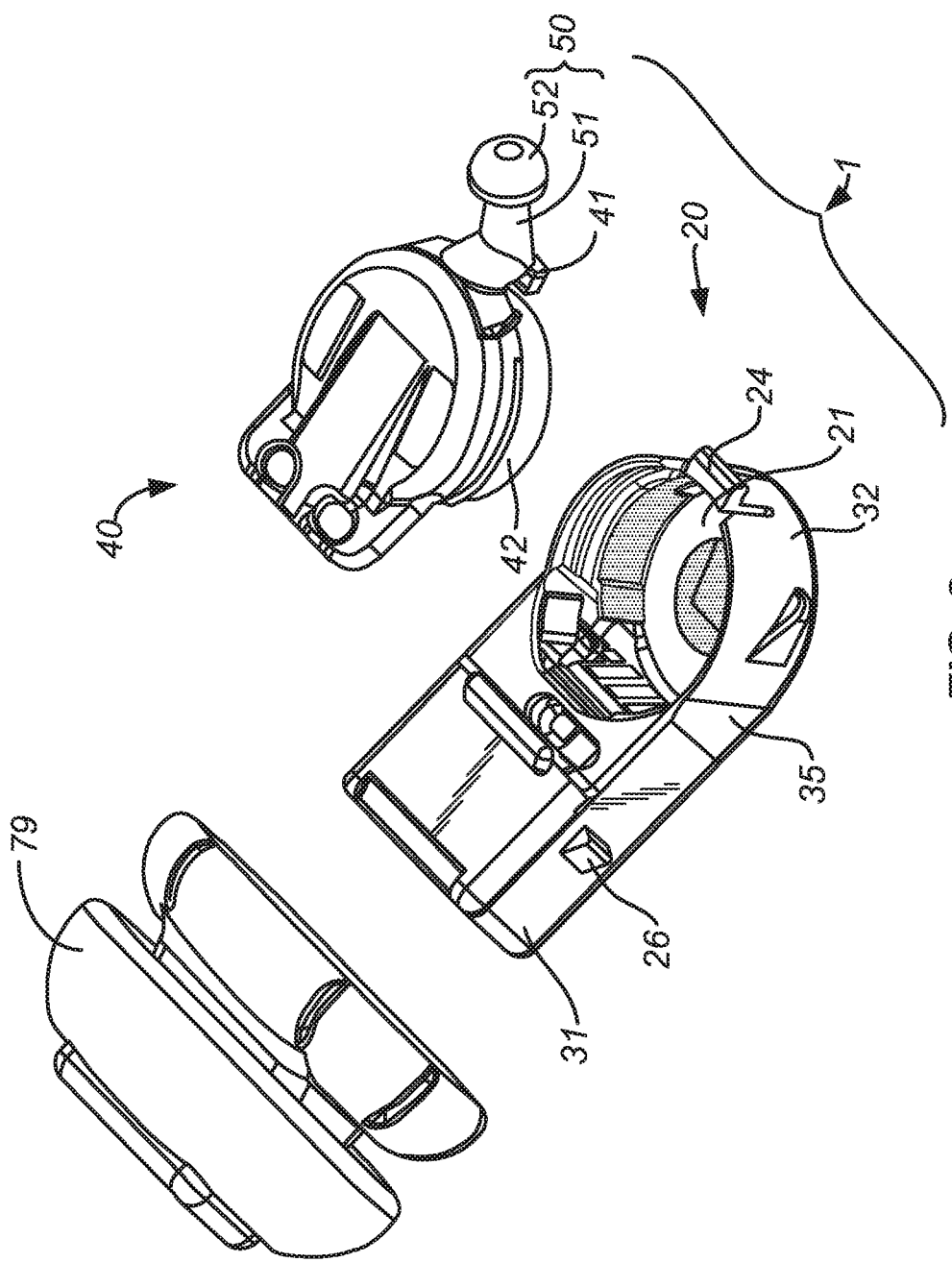
FIG. 2 is an isometric view of an embodiment of a modular canal hearing device assembly depicting a lateral module and a seal assembly detached.

The main module 20 may include a receiving cavity 21 (FIG. 2) shaped to accommodate the battery cell 42, at least partially within. The battery cell 42 may be rechargeable and have a generally cylindrical shape. The main module 20 may include electrical contacts 36 and 37 for electrically coupling the main module 20 with the battery cell 42 to power the electrical components within the main module 20 (e.g., amplifier circuitry and microphone). In some examples, the battery cell 42 may be partially disengaged so as to place the hearing device 1 in the OFF condition or during charging. The wireless hearing device 1 may include one or more of the features of canal hearing devices described in U.S. Pat. No. 8,467,556, titled, "CANAL HEARING DEVICE WITH DISPOSABLE BATTERY MODULE," U.S. Pat. No. 8,855,345, titled, "BATTERY MODULE FOR PERPENDICULAR DOCKING INTO A CANAL HEARING DEVICE," and U.S. Pat. No. 9,060,233, titled, "RECHARGEABLE CANAL HEARING DEVICE AND SYSTEMS," as well as pending patent application Ser. No. 14/832,751, titled, "CANAL HEARING DEVICE AND METHODS FOR WIRELESS REMOTE CONTROL OF AN APPLIANCE USING BEHIND THE TRAGUS SWITCH," filed Aug. 21, 2015, and Ser. No. 14/826,721, titled, "CANAL HEARING DEVICE AND METHODS FOR WIRELESS REMOTE CONTROL OF AN APPLIANCE," filed Aug. 14, 2015, all incorporated herein by reference in their entirety for any purpose.

The main section 20 may be coupled at its medial end 31 to an ear tip assembly 79. The ear tip assembly 79 is preferably manufactured of a flexible material, such as a polymer, and configured as a replaceable or disposable component. The ear tip assembly 79 may couple to the main section 20 by engaging with a holding tab 26. In some examples, the holding tab 26 may be positioned generally on the medial end 31 of the main section 20.

In some examples, the lateral end of the hearing device 1 may include a handle portion 50. The handle portion 50 may facilitate handling of the hearing device 1 during insertion or removal from the ear. The handle portion 50 may include a shaft 51 and a knob 52. In some examples, the handle portion 50 may include wireless electronics 74 and/or a wireless antenna 75 (collectively referred to as "wireless circuitry"). The wireless circuitry may be operable to connect the hearing device 1 to a network 65. In some examples, the lateral end of the hearing device 1 may include switches 78a-c for manual activation of a wireless service. In some examples, at least one of the switches 78a-c may be configured for placement substantially behind the tragus 5 of a user 100 when the hearing device 1 is provided in an ear of the user 100. The behind the tragus 5 switch may be activated by applying a manual force to the tragus 5. Placement and activation of the behind the tragus 5 switch may allow for inconspicuous wear of the hearing device 1 and use of the wireless service.

In some examples, the wireless hearing device system may include a personal computing device 10 configured to wirelessly couple to the hearing device 1 and the network 65. The personal computing device 10 may be a personal computer, a smartphone 13, a tablet, a portable media device, or any other device capable of executing computer instructions at a client side 2. The personal computing device 10 includes a processor and memory for storing executable instructions. The personal computing device 10 may be configured to execute the instructions to perform functions as described herein. The instructions may include instructions for executing one or more software applications, e.g., subscription validation app 33. The personal computing device 10 may include communications circuitry, such as a USB interface 38 or a wireless interface (e.g., Bluetooth). In some examples, the personal computing device 10 may be connected to a network 65, for example the Internet, to access a remote server 70.

Figure 4:
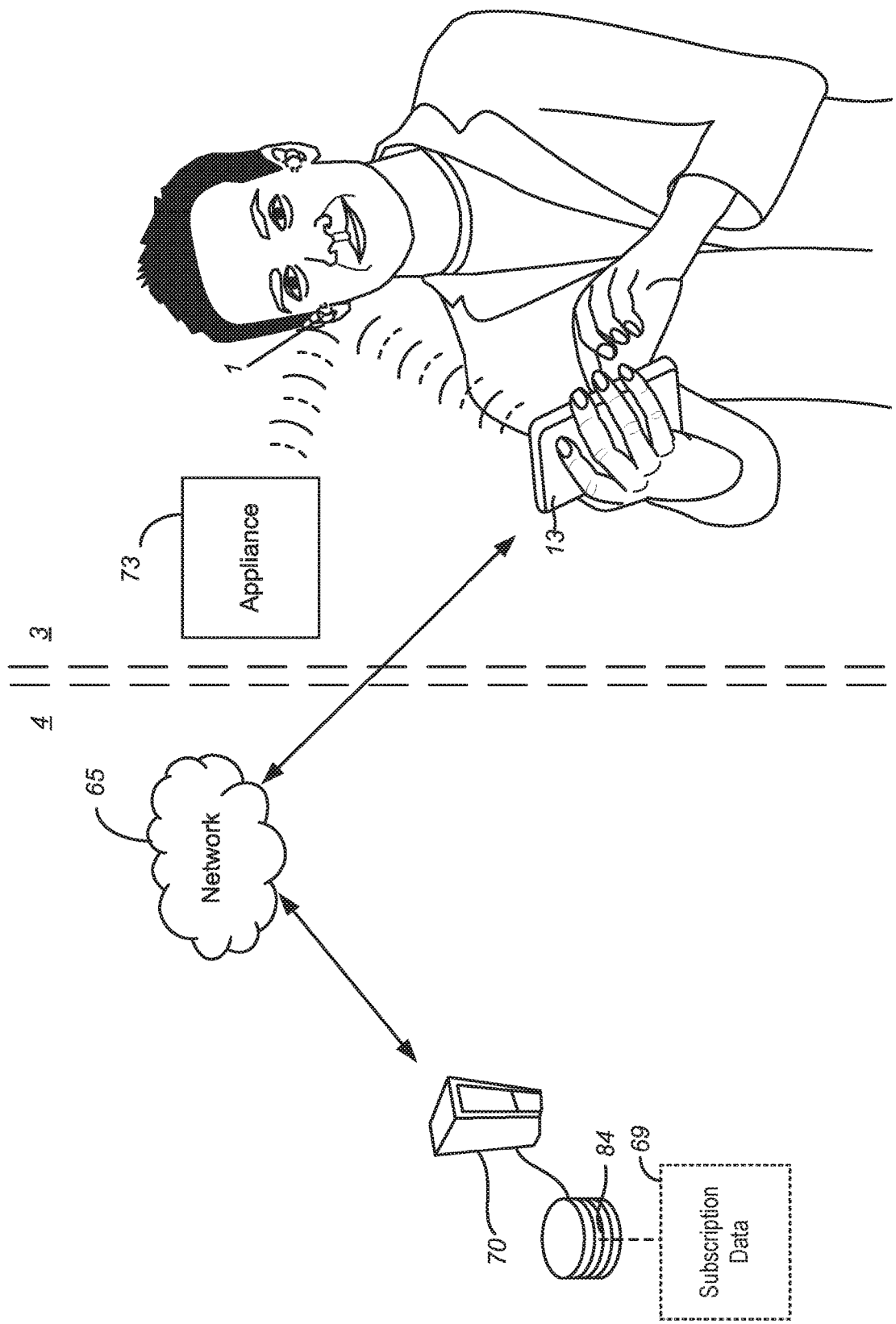
FIG. 4 is a schematic view of a wireless service for a hearing device communicatively coupled to an appliance and a computing device, where the computing device is in communication with a server over the Internet.
Figure 5:
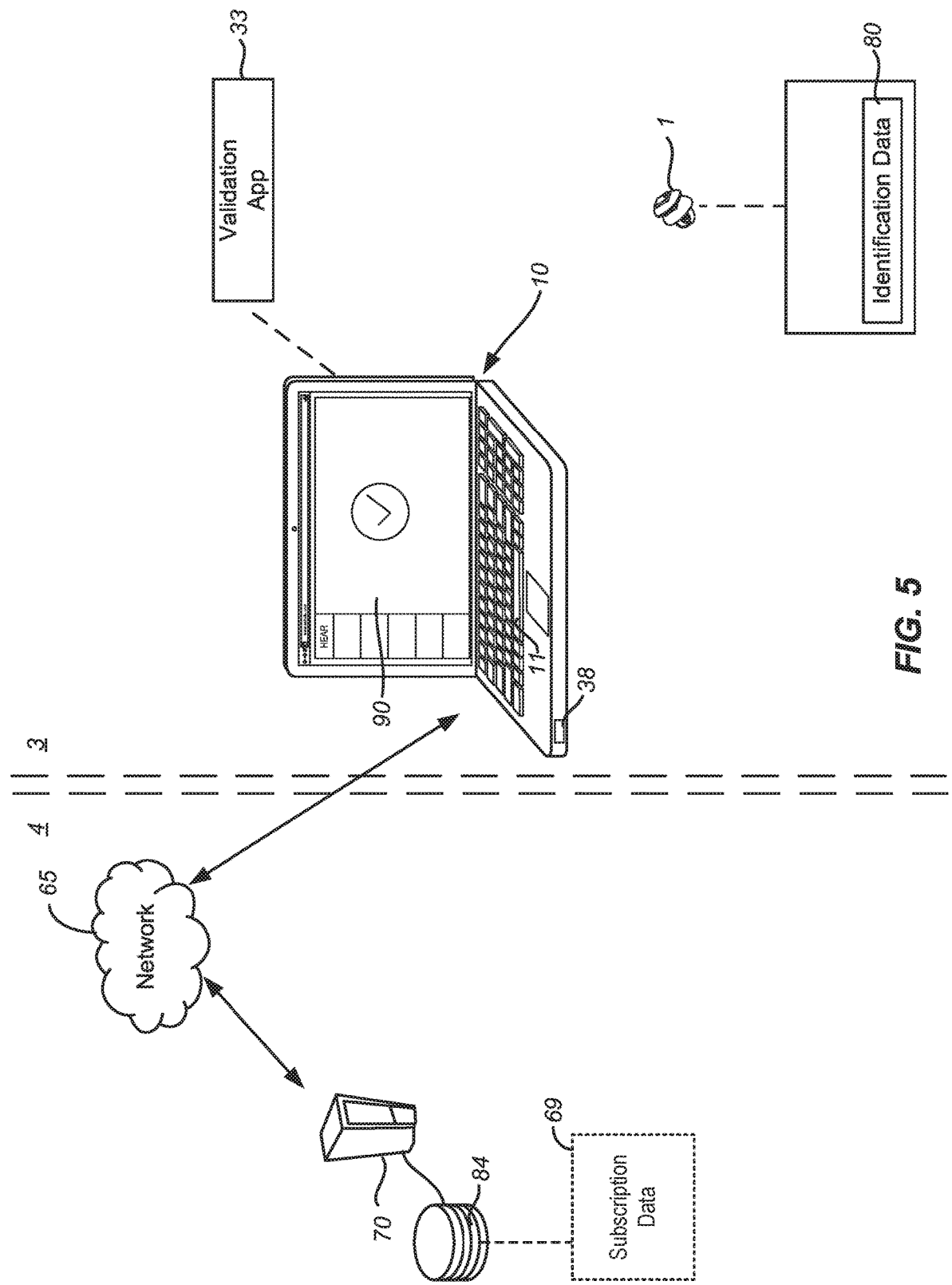
FIG. 5 is a schematic view of a subscription-based hearing device system comprising a remote server in communication with a hearing device using a computing device.

The personal computing device 10 may include a wireless interface for data transfer over Bluetooth, Wi-Fi, and/or other wireless protocols. The personal computing device 10 may be communicatively coupled to a network 65 via a gateway device 72, or any other type of device to access a network 65, for example the Internet, using Wi-Fi or Bluetooth communication. The gateway device 72 may be a router or a node of a mesh network. In some examples, the personal computing device 10 may wirelessly receive identification data 80 from the hearing device 1 (FIG. 5). The identification data 80 may be used to verify a subscription of the hearing device 1. In some examples, the computing device may be coupled to a remote server 70 with access to subscription data 69 associated with the subscription via the Internet, as shown in FIGS. 3-7. In some examples, the computing device 10 may verify the subscription of the hearing device 1. In some examples, the subscription may be verified by comparing the subscription data 69 and the identification data 80 of the hearing device 1. In some examples, the personal computing device 10 may enable or disable a wireless service, upon a determination of a valid subscription.

The personal computing device 10 may be configured to validate a subscription of the hearing device 1 using subscription data retrieved from a remote server and the identification data 80 associated with the hearing device 1. In some examples, the personal computing device 10 may be connected to the Internet to access a remote server 70 and web services. In some examples, the personal computing device 10 may transmit a request to the remote server 70 to retrieve subscription data 69 and/or validation data 74 from the remote server 70. The request may include forwarding identification data associated with the hearing device 1 (e.g., identification data 80). In some examples, the request may be initiated responsive to coupling of the personal computing device 10 with the hearing device 1. In response to the request, the personal computing device 10 may receive, from the remote server, either of the subscription data 69 or validation data which may be generated responsive to a subscription validation by the remote server 70. When receiving subscription data, the personal computing device 10 may determine the validity of the subscription via a client software application 33.

In some examples, the identification data 80 may include identifying information that may be unique to a particular hearing device. The subscription data 69 may include identifying information of hearing devices, which are authorized to provide one or more wireless services. During a validation process (e.g., during execution of the software application 33), identification data retrieved from memory of the hearing device 1 may be compared with the subscription data 69 to determine if the hearing device 1 should be enabled to provide a given wireless service. A subscription is said to be validated upon a determination that the hearing device 1 should be enabled for a given wireless service based on the comparison between the identification data and subscription data. The wireless service may subsequently be enabled on the hearing device 1 responsive to the validation of the subscription.

Figure 6:
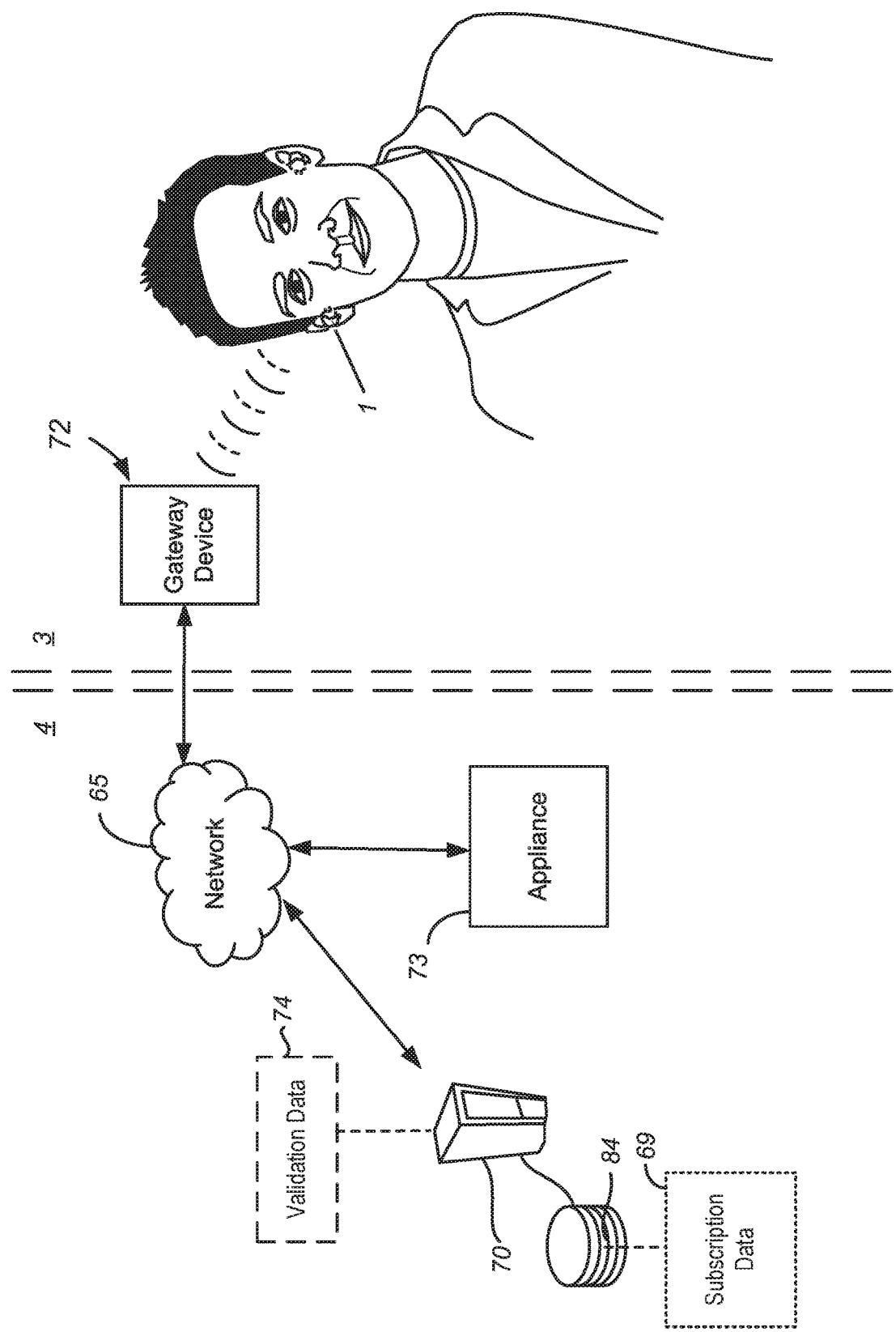
FIG. 6 is a schematic view of a hearing device in communication with a remote server and an appliance via a gateway device over a network.
Figure 7:
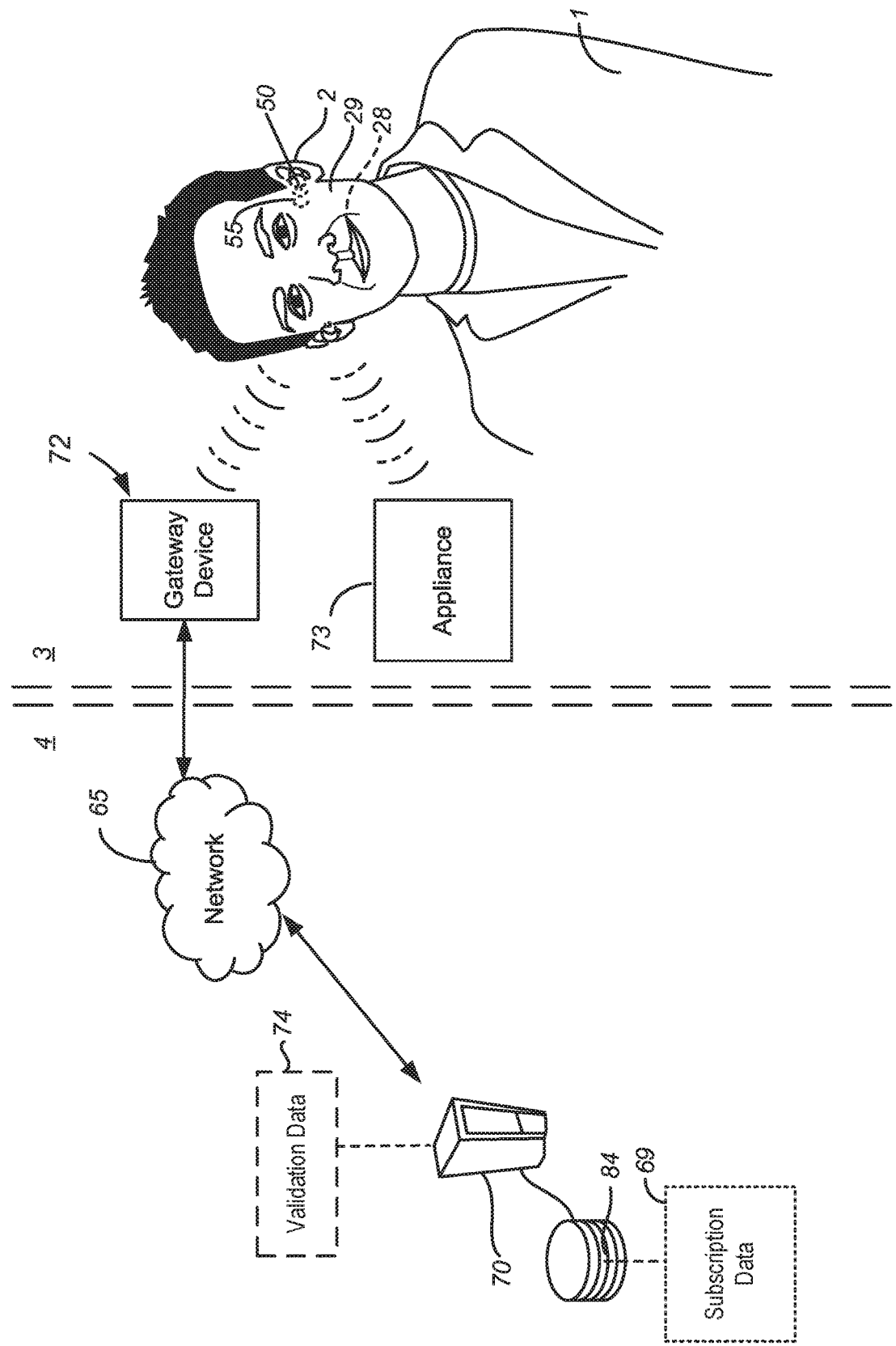
FIG. 7 is a schematic view of a hearing device in communication with a server via a gateway device over a network and an appliance on the client side.

The wireless hearing device 1 may be configured to selectively provide a wireless service to a user 100 of the hearing device 1. By selectively, it may be generally understood, that the wireless hearing device 1 may be configured to activate, control, enable and/or disable one or more wireless services in accordance with the subscription data 69. A wireless service may provide a desired functionality. For example, the wireless service may include remotely controlling an appliance 73, such as a wireless electronic lock, an electronically-controlled lighting, a home appliance, and a wireless medical device. The wireless service may include providing an online hearing aid fitting. The wireless service may include a subscription-based audio streaming service. The wireless service may include using physiological sensors of the hearing device 1 to provide a medical service and/or activity tracking. Any of the wireless services may be enabled, disabled, and/or controlled by the wireless hearing device 1 in accordance with a service subscription. Controlling of any of the wireless services may include changing a parameter of the wireless service based on the subscription data 69 and/or the validation data 74, such as a tier in a multi-tiered wireless service, hearing test parameters, medical alert parameters, and/or appliance parameters. The appliance 73 may be on a client side 3 or a remote side 4. In some examples, an appliance 73 on the client side 3 may be controlled by the wireless hearing device 1 using a direct wireless connection between the appliance 73 and the wireless hearing device 1, as shown in FIG. 7. In some examples, an appliance 73 on a remote side 4 may be controlled by the hearing device 1 using a gateway device 72, as shown in FIG. 6. In some examples, an appliance 73 may stream audio to the hearing device 1, as shown in FIG. 4. In some examples, a personal computing device 10, for example smartphone 13, may be in communication with the hearing device to exchange data, for example to conduct an online hearing test or an online hearing aid fitting, as shown in FIG. 4.

Figure 3:
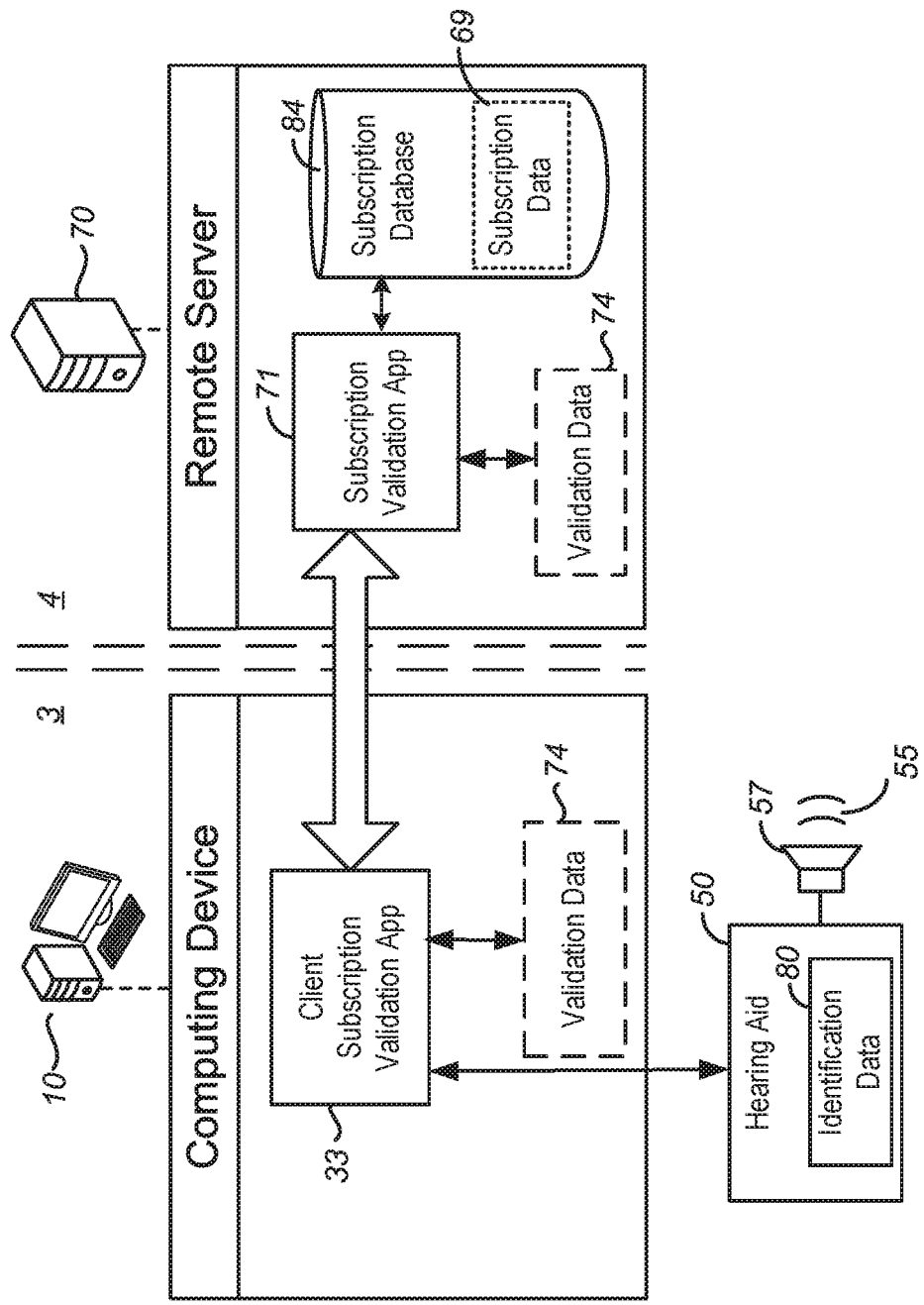
FIG. 3 is a schematic view of a subscription-based hearing device system including a hearing device, a client computer, and a remote server.

A software application for control or validation of a service subscription may be executed by any device associated with the hearing device 1, such as the personal computing device 10 (e.g., client subscription validation app 33) or the remote server 70 (e.g., remote subscription validation app 71), as shown in FIG. 3. The software application 33 may initiate a subscription validation request and/or initiate the wireless service upon subscription validation. In some examples, the software application may be embedded, browser-based or standalone. In some examples, the software application may include embedded code executable by a device associated with the hearing device system, such as a charging station. In some examples, the hearing device user 100 may be required to login to access the software application. The software application may include a user interface 90 for logging in, viewing a subscription, and/or modifying the service subscription.

The remote server 70 provided on a server side 4 may be accessible via the network 65 to any devices communicatively associated with the wireless hearing device 1 on a client side 3, such as the personal computing device 10 (e.g., a smartphone 13). The remote server 70 may receive requests for validation of a service subscription from the personal computing device 10. The remote server 70 may access subscription data 69 from a subscription database 84. The remote server 70 may deliver subscription data 69 or validation data 74 to the personal computing device 10 that requested validation of a subscription of a user 100 or potential subscriber of the hearing device 1. Subscription data 69 may include a subscription validity determination and/or may be used to validate the subscription.

In some examples, the remote server 70 on the server side 4 may execute a remote subscription validation application 71. The remote subscription validation application 71 may determine subscription validity using information stored in a subscription database 84. In some examples, a client subscription validation application 33 may be executed by the computing device 10 for determining subscription validity. For example, the subscription validation application 33 may initiate the subscription validity determination upon detection of the hearing device 1. The subscription validation application 33 may request the subscription validity determination. The request may include submitting identification data 80 associated with the hearing device 1. The personal computing device 10 may be in communication with the remote subscription validation application 71 for determining subscription validity. In some examples, the remote subscription validation application 71 may receive identification data 82 and determine service subscription validity using the subscription database 84. The subscription validity determination may be transmitted to the client subscription validation application 33. The client subscription validation application 33 may receive the subscription data 69 and make a subscription validity determination. Wireless services associated with the hearing device 1 may be enabled or disabled according to the service subscription validity condition, for example a valid subscription condition or an invalid subscription condition.

The wireless hearing device system may include a wireless gateway device 72, which may be used for connecting to a network and communicating with one or more components of the wireless hearing device system. For example, the wireless gateway device may be used for accessing a remote subscription database 84. In some examples, the gateway device 72 may transmit and/or receive data from the remote subscription database 84, an appliance 73, and/or a personal computing device 10. For example, the gateway device 72 may transmit a query to the remote subscription database 84, an appliance 73, and/or a personal computing device 10. The gateway device 72 may receive a result responsive to the query and deliver the result to the hearing device 1. In some examples, the gateway device 72 may include any of a router, an access point, a wireless bridge, and a node of a mesh network. As described herein, in some examples, the validation process may be performed by a computing device on the client side 3 (e.g., personal computing device 10). In some examples, the validation process may be performed by a computing device on the remote side 4 (e.g., remote server 70). In some examples, the hearing device 1 receives validation data 74. Communication may be established between the hearing device 1 and a remote server through the gateway device 72. The gateway device may transmit to the remote server a request for validation of a subscription of the hearing device. The remote server may perform a validation process and transmit, through the gateway device 72, validation data 74 to the hearing device 1. The validation data 74 may be indicative of a valid subscription of the hearing device 1. The wireless hearing device 1 may be configured to enable a given wireless service upon receipt of validation data indicative of a valid subscription of the wireless hearing device 1 for the given wireless service. The wireless hearing device 1 may be configured such that the wireless service is not enabled or to disable a given wireless service upon receipt of validation data which is not indicative of a valid subscription of the wireless hearing device 1 for the given wireless service.

In some examples, the network 65 may be a mesh network. The gateway device 72 may be a node connected to the mesh network. In some examples, the mesh network may be accessible by the hearing device 1 using any wireless protocol including Bluetooth Low Energy, ZigBee, or Wi-Fi. The wireless hearing device 1 may deliver or receive a signal from the gateway device 72 to facilitate communication between the hearing device 1 and another device on the mesh network, such as an appliance 73. In some examples, the gateway device 72 may utilize any number of intermediate devices on the mesh network to relay a signal to a target device. It may be advantageous to utilize a mesh network to allow the wireless hearing device 1 to communicate over a greater range than typically possible over a low energy wireless system such as Bluetooth Low Energy. In addition, utilizing a mesh network may allow the wireless hearing device 1 to communicate with a remote server 70 using a device on the mesh network with Internet access.

In some examples, a software application may include functionality to automatically detect when a wireless service is available to use. Upon detection of the availability to use, the software application may initiate a subscription validation request, or proceed with enabling or disabling the wireless service associated with the wireless hearing device 1 in accordance with the service subscription. The software application may initiate a subscription validation request in response to detecting a hearing device in proximity, such as when the hearing device is worn in an ear (in-situ) of a subscriber and the device executing the software application is proximate thereto. The subscription validation request may also be initiated in response to a user activating a switch 78a-c of the canal hearing device assembly for a user attempting to use a wireless service of the wireless hearing device 1. In some examples, the subscription validation request may be automatically performed periodically.

In some examples, a software application may determine a subscription status by obtaining an identification data 80 from the wireless hearing device 1. Identification data 80 may include a serial number, a user name or an identification number, or any other kind of identification data stored in the wireless hearing device 1. In some examples, the identification data 80 may be provided by a user. When the software application is executed by the computing device, the computing device 10 may deliver the identification data 80 to the remote server 70 using a network, for example the Internet. In some examples, the software application may transmit the identification data 80 to the remote server 70 to receive or determine a subscription status to control a wireless service and/or program the hearing device 1, for example enabling or disabling the wireless service.

In some examples, the subscription status may be based on a usage of the wireless service. In some examples, the hearing device 1 may comprise circuitry or software configured to measure or count usage of the wireless service. In some examples, the hearing device 1 may comprise a clock or timer configured to record a duration of use of the wireless service. In some examples, the hearing device 1, the personal computing device 10 or the remote server 70 may store a subscription credit count, for example a number of uses or use duration. The subscription credit count may be decremented based on usage by the user 100. The personal computing device 10 may periodically communicate with the remote server 70 to synchronize the subscription credit count based on usage, renewals, cancellations, etc. The personal computing device 10 may enable or disable the wireless service of the wireless hearing device 1 according to the credit and authorization for the wireless service following synchronization with the remote server 70.

The remote server 70 may receive the identification data 80 and query a database 84 for service subscription data 69 associated with the wireless hearing device 1, as shown in FIGS. 3-7. In some examples, the remote server 70 may deliver the subscription data 69 obtained from the database 84 to the device that requested it, for example the personal computing device 10. In some examples, the remote server 70 may perform a validation of a subscription and deliver a determination of whether the service subscription is valid or not. The remote server 70 may perform the validation of the subscription from service subscription data 69. The remote server 70 may host a website and/or an application, for example subscription validation app 33, as shown in FIG. 3.

In some examples, a service subscription may be determined to be invalid, for example due to a non-payment or service subscription expiration. When the service subscription is determined to be invalid, the wireless service associated with the wireless hearing device may be disabled. An indicator may alert the user of the invalid subscription. The indicator may be an audible alert delivered to the user's ear. In some examples, the hearing device 1 may allow a limited use of the wireless service upon determining an expired service subscription to allow a subscriber a reasonable time period (grace period) to remedy the cause of the invalid subscription. The limited use may include reduced functionality of the wireless service. In some examples, the wireless hearing device 1 and or the appliance 73 may be reprogrammed to disable the wireless service upon a determination of an invalid or an expired service subscription. The wireless hearing device 1 may be programmed to deliver a warning message to alert a subscriber about the need to renew the service subscription, for example to request making a payment.

In some examples, the wireless service may include providing a medical service, activity tracking or health monitor. Physiologic sensors may be incorporated within the wireless hearing device 1 in conjunction with providing the medical service and/or activity tracking. The physiologic sensors may include, but are not limited to, electrodes, a heart rate sensor, a temperature sensor, oxygen level sensor, accelerometer, gyroscope, and a glucose level sensor. It will be understood that a variety of physiological and motion sensors may be included in the wireless hearing device 1.

Incorporating the physiological sensors within the hearing device 1 may be advantageous because the ear canal 14 is tethered to the human body during activity, for example during walking or exercise, and the physiology of the ear canal 14 includes capillaries suited to measure certain physiological parameters such as heart rate. Additionally, blood to the ear canal 14 is usually supplied by the branches of the common carotid artery, which contributes directly to the perfusion of the brain. Thus, placing the physiological sensors in the hearing device 1 may allow for more reliable physiological measurements because the ear canal 14 may be less affected by movement, temperature changes, and other sources of variability that are experienced by the periphery of the body. Further, a processor within the wireless hearing device 1 may execute software to mitigate noise due to motion artifacts (e.g., walking or chewing).

The medical service may include medical condition reporting or an emergency alert, such as a fall or a heart attack. In some examples, a fall may be detected using an accelerometer and/or a gyroscope within the wireless hearing device 1. In some examples, a heart attack may be detected using a heart rate sensor within the wireless hearing device 1. The wireless hearing device 1 may determine that the medical emergency has occurred when the sensor readings match one or more of the patterns. The hearing device 1 may communicate with a remote medical alert service based on the determination that the medical emergency has occurred. In some examples, the remote medical alert service may be alerted when the user 100 presses a switch 78*a-c* on the hearing device 1. In some examples, the switch 78*a-c* may be pressed for a prolonged period, such as 2 or more seconds, indicating a medical emergency. A prolonged press may be advantageous to ensure that the switch 78*a-c* is not being accidently pressed, or to differentiate from other remote control functions not associated with a medical emergency. The medical service, for example integrations with a professional provider, may be defined in the subscription data 69.

The activity tracking or health monitoring service may include automatic tracking of health parameters, such as heart rate, steps, or calories burned. Since the wireless hearing device 1 can be worn in the ear for prolonged periods of time and may be inconspicuously worn, it may be desirable for the hearing device user 100 to track activity. Further, the wireless hearing device 1 may be better suited to provide activity tracking due to its position in the ear canal 14, as discussed above. The analytics of tracked activity to monitor and store, may be defined in the service subscription data 69. In some examples, the activity tracking or health monitoring data, or analytics calculated therefrom, may be sent to a provider or compared to levels received from a provider in accordance with the service subscription data 69. The hearing device 100 may be audibly alerted if not in compliance with levels defined by the provider.

Examples disclosed herein offer a subscription-based wireless service for a wireless hearing device with minimal upfront payment, while ensuring adequate revenue stream for a manufacturer or a service provider. The enabling or disabling of the wireless service may be performed by the wireless hearing device 1, or a computing device providing a wireless service, for example audio streaming to the wireless hearing device, or a medical alert system, on a subscription basis. Subscription-based wireless services can be advantageous to defray the cost of use, or ownership of a hearing device. Furthermore, a subscription based model may allow a consumer to subscribe to certain selected features and services, thereby eliminating costs associated with unwanted features.

Although examples of the invention have been described herein, it will be recognized by those skilled in the art to which the invention pertains from a consideration of the foregoing description of presently preferred and alternate embodiments and methods of fabrication and use thereof, and that variations and modifications of this exemplary embodiment and method may be made without departing from the true spirit and scope of the invention. Thus, the above-described embodiments of the invention should not be viewed as exhaustive or as limiting the invention to the precise configurations or techniques disclosed. Rather, it is intended that the invention shall be limited only by the appended claims and the rules and principles of applicable law.

What is claimed is:

1. A wireless hearing device system for providing a wireless service in accordance with a subscription, comprising:
a hearing device configured to provide hearing enhancement and to selectively provide one of a plurality of wireless services in accordance with a subscription of the hearing device to the wireless service, the wireless service being unrelated to the hearing enhancement, the hearing device comprising:
wireless circuitry configured to communicate with an external appliance and to provide the wireless service via a wireless signal;
a microphone;
a processor configured to enhance sounds received by the microphone to provide the hearing enhancement;
a memory; and
speaker configured for placement in the ear; and
a personal computing device configured to communicatively couple to the hearing device and provide, to the hearing device, parameters associated with the external appliance,
wherein the wireless hearing device system is configured to validate a subscription of the hearing device to the wireless service using subscription data retrieved from a remote server, and wherein the wireless hearing device system is configured to enable or disable the wireless service responsive to subscription determination.

2. The wireless hearing device system of claim 1 further configured to receive the identification data associated with the hearing device.

3. The wireless hearing device system of claim 1, wherein the external appliance is any of an electronic lock, a wireless-controlled lighting, a mobile phone, a home appliance, and a medical device.

4. The wireless hearing device system of claim 1, wherein the hearing device comprises a switch configured for activation of the wireless service or the external appliance.

5. The wireless hearing device system of claim 1, wherein the wireless service comprises controlling any of an electronic lock, an electronic-controlled lighting, a home appliance, and a medical device.

6. The wireless hearing device system of claim 1, wherein the wireless service comprises a wireless audio streaming service.

7. The wireless hearing device system of claim 1, wherein the wireless circuitry is configured for Bluetooth communication.

8. The wireless hearing device system of claim 1, wherein the personal computing device comprises any of a personal computer, a smartphone, a tablet, and a portable media device.

9. The wireless hearing device system of claim 1, wherein the hearing device is communicatively coupled to the personal computing device using Bluetooth.

10. The wireless hearing device system of claim 1, wherein the hearing device is configured for inconspicuous wear.

11. A method of providing a wireless service by a wireless hearing device in accordance with a subscription, the method comprising:

communicatively coupling a hearing device, which is configured to enhance sounds received by the hearing device to provide hearing enhancement, to a personal computing device, wherein the hearing device is further configured to communicate wirelessly with an external appliance in proximity thereto to selectively provide a wireless service unrelated to the hearing enhancement, wherein the wireless service is one of a plurality of wireless services and is selectively provided by the hearing device in accordance with a subscription of the wireless hearing device to the wireless service;

receiving, by the personal computing device, identification data associated with the hearing device;

receiving, by the personal computing device, subscription data from a remote server, wherein the subscription data is determined using the identification data associated with the hearing device; and selectively enabling the wireless service or controlling the wireless service in accordance with the subscription data; and transmitting a wireless signal to provide the wireless service.

12. The method of claim 11, further comprising transmitting a request to the remote server, the request including the identification data associated with the hearing device.

13. The method of claim 11, further comprising detecting, by the personal computing device, an activation of a switch on the wireless hearing device.

14. The method of claim 11, further comprising automatically receiving, by the personal computing device, the identification data associated with the hearing device upon detecting the hearing device in proximity to the computing device, to the external appliance, or both.

15. The method of claim 11, wherein the enabling or controlling a wireless service comprises enabling or controlling via a wireless signal any of an electronic lock, an electronic light, a home appliance, and a medical device with the hearing device.

16. The method of claim 11, wherein the enabling or controlling a wireless service comprises enabling or controlling a wireless audio streaming service to the hearing device.

17. A wireless hearing device system for providing a wireless service in accordance with a subscription, comprising:

a wireless hearing device configured to provide hearing enhancement and further configured to selectively provide a wireless service not related to the hearing enhancement, the wireless service is one of a plurality of wireless services selectively enabled for the wireless hearing device in accordance with a subscription of the wireless hearing device to the wireless service, the wireless hearing device comprising:

wireless circuitry configured to provide a wireless signal for the wireless service;
a speaker; and
a memory, wherein the memory stores identification data associated with the wireless hearing device; and an external device configured to communicatively couple to the wireless hearing device for selectively providing the wireless service provided via the wireless service, wherein the wireless hearing device system is configured to selectively enable the wireless service for the wireless hearing device from the plurality of wireless services upon a valid subscription determination and to disable the wireless service upon an invalid subscription determination, without altering or disabling the hearing enhancement provided by the wireless hearing device.

18. The wireless hearing device system of claim 17, wherein the wireless circuitry is configured for Bluetooth communication.

19. The wireless hearing device system of claim 17, wherein the wireless circuitry comprises a wireless antenna provided in the wireless hearing device.

20. The wireless hearing device system of claim 17, wherein the wireless hearing device comprises a switch configured for activation of the wireless service.

21. The wireless hearing device system of claim 17, wherein the wireless hearing device is communicatively coupled to a gateway device.

22. The wireless hearing device system of claim 17, wherein the wireless service comprises controlling any of an electronic lock, an electronic light, a home appliance, and a medical device.

23. The wireless hearing device system of claim 17, wherein the wireless service comprises a wireless audio streaming service.

24. A method of providing a wireless service by a wireless hearing device in accordance with a subscription, the method comprising:

communicatively coupling a wireless hearing device configured to provide hearing enhancement to a personal computing device, the wireless hearing device comprising a speaker configured for placement in the ear, and comprising wireless electronics configured to provide one or more wireless signals for selectively providing a selected wireless service of a plurality of available wireless services, wherein the selected wireless service is unrelated to the hearing enhancement;

transmitting identification data associated with the wireless hearing device to the personal computing device;

controlling the selected wireless service in accordance with a subscription of the wireless hearing device to the selected wireless service, wherein said controlling the selected wireless service comprises providing the selected wireless service by the wireless hearing device via the wireless signal responsive to a determination of a valid subscription to the selected wireless service of the plurality of available wireless services and disabling the selected wireless service of the plurality of the available wireless services responsive to an invalid subscription determination without disabling the hearing enhancement of the wireless hearing device.

25. The method of claim 24, wherein the wireless hearing device is communicatively coupled to a remote server via a gateway device.

26. The method of claim 24, wherein the wireless hearing device is communicatively coupled to a local area network or the Internet.

27. The method of claim 26, wherein the local area network comprises a mesh network.

28. The method of claim 24, wherein the selected wireless service comprises controlling any of an electronic lock, an electronic light, a home appliance, and a medical device.

29. The method of claim 24, wherein the selected wireless service comprises a wireless audio streaming service.

30. The method of claim 24, wherein the selected wireless service comprises controlling an appliance.

* * * * *